Jan. 15, 1963 W. MANNING 3,073,619
FLUID SPRING VEHICLE SUSPENSIONS
Filed June 27, 1960 5 Sheets-Sheet 1
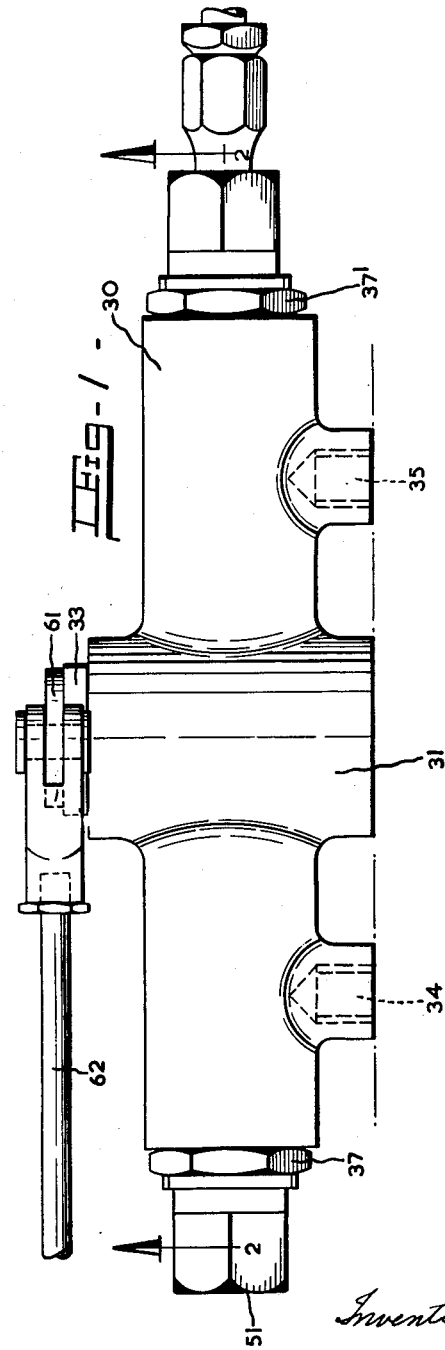

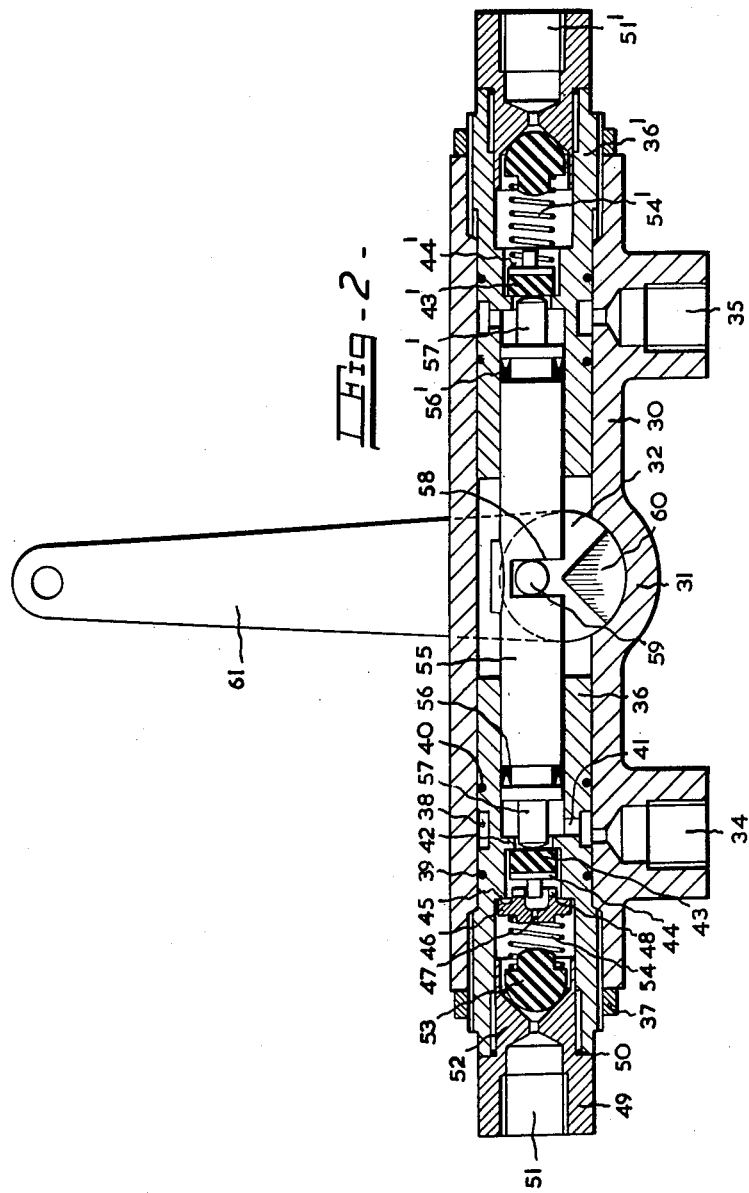

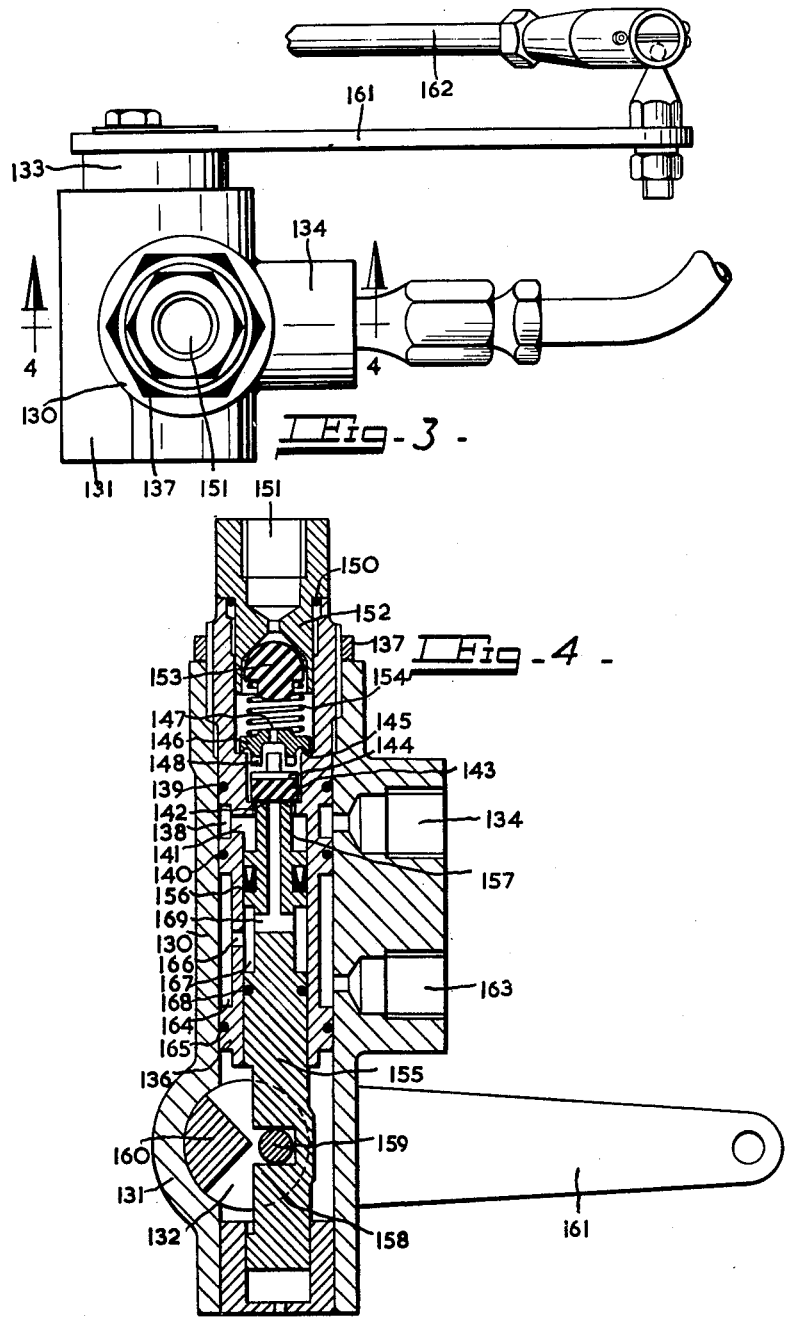

Jan. 15, 1963  W. MANNING  3,073,619
FLUID SPRING VEHICLE SUSPENSIONS
Filed June 27, 1960  5 Sheets-Sheet 4
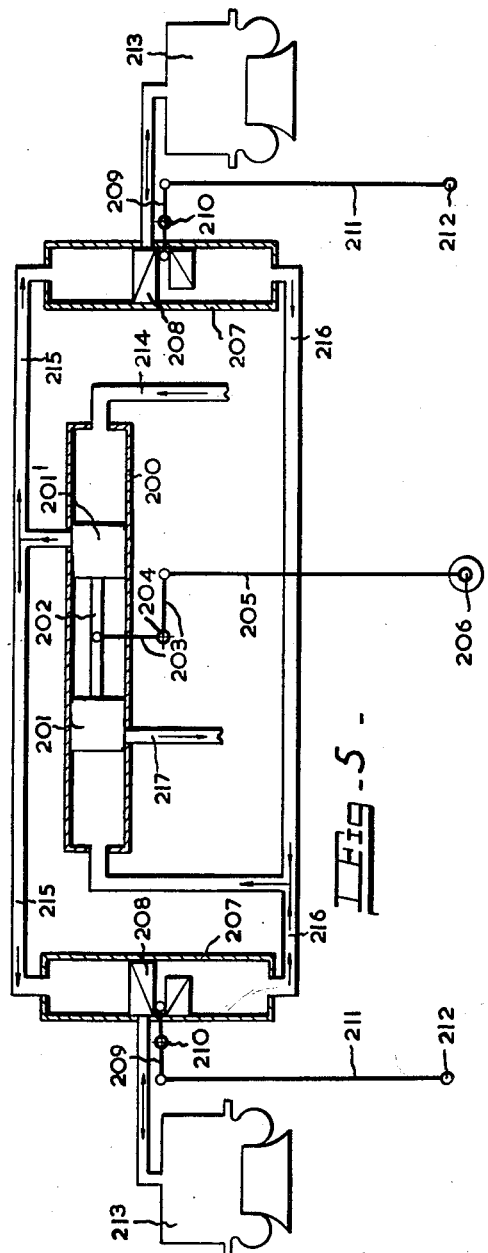

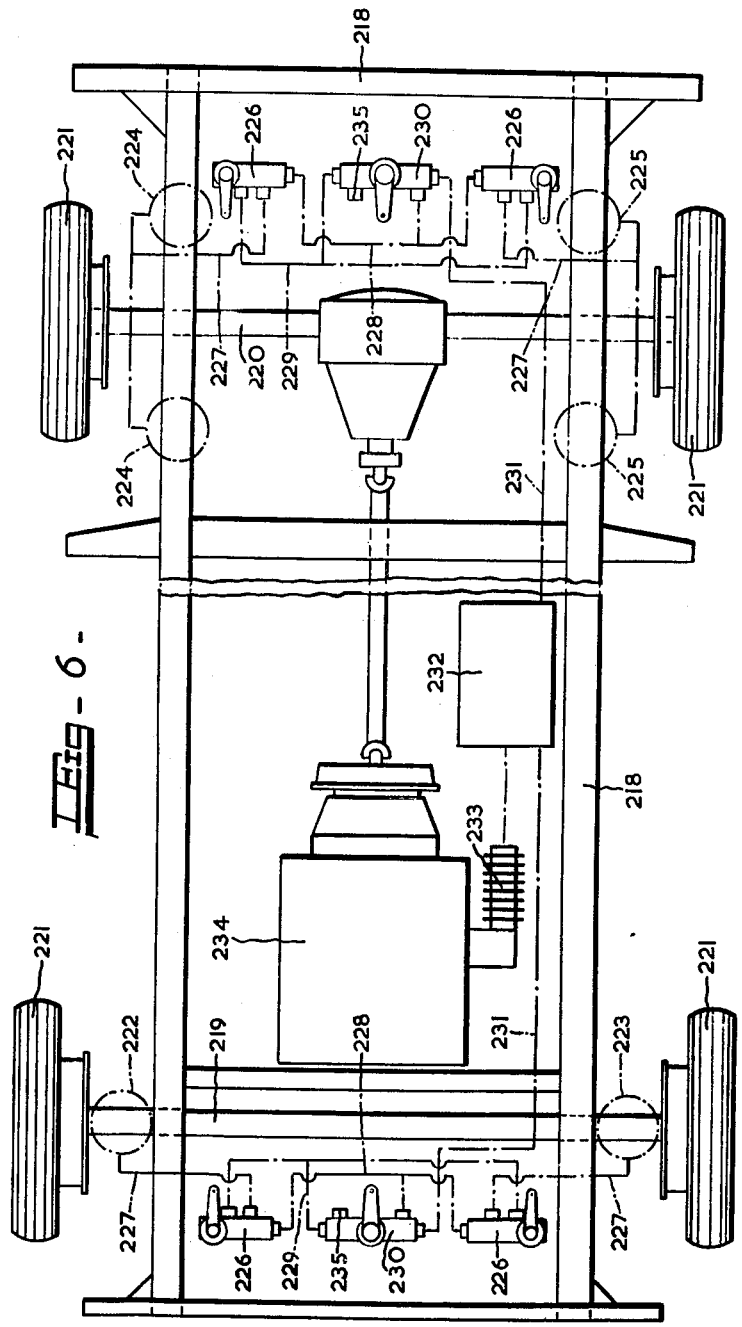

United States Patent Office 3,073,619
Patented Jan. 15, 1963

3,073,619
FLUID SPRING VEHICLE SUSPENSIONS
Walter Manning, Wolverhampton, England, assignor, by mesne assignments, to Guy Motors (Europe) Limited, Paddington, London, England
Filed June 27, 1960, Ser. No. 39,123
Claims priority, application Great Britain July 1, 1959
3 Claims. (Cl. 280—124)

This invention relates to vehicle suspensions of the kind in which the sprung portion of the vehicle (hereinafter referred to as the body) is supported at least partially on a pair of laterally spaced wheel units through the intermediary of a pair of fluid spring means one associated with each wheel unit, and in which each fluid spring means is connected to an associated levelling valve actuated in response to relative vertical movement between the wheel unit and a neighbouring part of the vehicle body connecting the fluid spring means to inlet ducting for pressurized fluid when the body is too low with respect to the wheel unit, and connecting the fluid spring means to exhaust ducting when the body is too high with respect to the wheel unit.

The term vehicle must be understood to include both self-powered vehicles and trailers, and the term wheel unit includes an individual wheel, a dual wheel or other wheel combination.

Whilst the invention is applicable for use with hydraulic springs it is found to be particularly advantageous when used with air springs.

In a known air suspension of this kind, as applied to a four-wheeled vehicle each wheel has a levelling valve of which the inlet ducting is connected directly to a source of compressed air. The levelling valves are all of the instantaneous kind, that is valves which respond immediately to the relative movement between the wheels and the body or chassis. One disadvantage of this system of suspension is that a relatively large amount of compressed air is used. Another disadvantage is that when the vehicle rocks from side to side air is alternately introduced into and withdrawn from each spring, and the resilient properties of the spring are not used to full effect. In order to overcome these disadvantages it has been proposed to use time-delay levelling valves, that is levelling valves which only come into operation a predetermined time, for example 7 seconds, after being actuated. Such valves reduce the quantity of air used and allow the springs to act resiliently, but they are relatively costly and are also of relatively delicate construction. Further, their use often results in unsatisfactory performance of the vehicle. When a vehicle incorporating such a valve system is started, for example, differences in the time delay as between the valves may result in the vehicle being temporarily supported between diagonally opposed wheels and being capable of rocking about this diagonal. In addition when the vehicle performs certain manoeuvres the system is most unsatisfactory. If the vehicle, for example, is driven past a traffic island of the kind frequently used at road junctions, it initially follows an S-shaped path. The time delay of the valves is usually of the same order as the time taken to negotiate the first part of the path, and the valves may come into operation, compensating for the vehicle's swing in one direction, just as the vehicle is starting to swing in the other direction. This can be most dangerous with tall vehicles such as "double-decker buses."

In another known air suspension system the levelling valves are dispensed with and each pair of wheel units has a single central control valve responsive to relative vertical movement between the wheel units as a whole and the vehicle body or chassis, but not responsive to rocking movement of the vehicle. The control valve is generally similar to the levelling valves previously described but is arranged to connect both springs to the fluid inlet duct or both springs to the fluid outlet duct. Instantaneous or time-delay valves may be used. In one form the springs are only interconnected when the control valve is operating. When the system is put into operation, as on starting the vehicle, there is no inherent means for preventing more air entering one spring than the other, with the result that unless additional means are provided the vehicle body or chassis may lean over to one side. In another form the springs are permanently interconnected. Here the same difficulty occurs, and in addition there is little or no force exerted by the springs to prevent the vehicle rocking. It is therefore necessary to provide other means such as metal springs for keeping the vehicle level.

In yet another known air suspension system as applied to a four-wheeled vehicle levelling valves are provided for one pair of wheels and a central control valve for the other pair of wheels.

That end of the vehicle by the levelling valves is, of course, kept level, but the other end of the vehicle is only kept level by the stiffness of the body, and if the vehicle is relatively long there may be a pronounced tendency for the body to twist about a longitudinal axis as between one end and the other. In addition, in a vehicle with frequently changing loads on the wheels, as for example a public service vehicle, the two levelling valves involve the use of an excessive amount of air.

The present invention has for its object the provision of a vehicle suspension of the kind specified with the aid of which the disadvantages associated with the previously known suspensions can be overcome or reduced.

According to one aspect of the present invention, a vehicle suspension of the kind specified is characterised by the provision of master control means normally preventing fluid flow to or from the spring means but enabling fluid flow to occur, under control of the levelling valves, when the position of the wheel units relative to the body varies to a predetermined extent from the desired position.

According to another aspect of the present invention a vehicle suspension of the kind specified is characterised by the provision of master valve means in the fluid inlet ducting and in the fluid exhaust ducting, and master valve actuating means for opening the master valve means in the fluid inlet ducting when the load on the wheel units is increased sufficiently to compress the fluid spring means to a predetermined extent and for opening the exhaust ducting when the load on the wheel units is decreased sufficiently to allow the fluid spring means to expand to a predetermined extent but not actuating the master valve means on rocking movement only of the body with respect to the wheel units.

The invention will now be more particularly described with reference to the accompanying drawings in which:

FIGURE 1 is a side view of master valve means of the kind which may be incorporated in a vehicle suspension in accordance with the invention FIGURE 2 is a section along the line 2—2 of FIGURE 1

FIGURE 3 is an end view of a levelling valve of the kind which may be incorporated in a vehicle suspension in accordance with the invention FIGURE 4 is a section along the line 4—4 of FIGURE 3, FIGURE 5 is a schematic diagram showing the elevation of an air suspension system embodying the present invention, and FIGURE 6 is a diagrammatic plan view of a vehicle chassis incorporating suspension systems in accordance with the invention, showing the interconnections between the component parts.

The drawings all relate to air suspension systems but it will be understood that with relatively simple modifications the parts illustrated could be adapted for use in suspension systems of the kind incorporating air or other gas springs controlled by a relatively incompressible liquid.

Referring firstly to FIGURES 1 and 2 the master valve means suitable for use with the suspension system of this invention comprises a generally cylindrical body 30 with a through bore enlarged at its centre to form a housing 31 for the end portion 32 of an operating shaft 33 normal to the axis of the bore, this end portion projecting through the wall of the housing. The body is also formed with two valve outlet ports 34 and 35 in its side wall, one about half way between each end of the body and the centre thereof.

A valve is provided at each end of the body 30.

The valve to the left in FIGURES 1 and 2 is that for insertion in the fluid exhaust ducting and the valve to the right is that for insertion in the fluid inlet ducting. These valves are substantially identical in construction and only that to the left will be described in detail. Parts of the other valve corresponding to the valve described will be referred to by the same reference numerals but will be distinguished by the addition of an index.

The lefthand valve comprises a sleeve 36 projecting into one end of the body 30, its inner end being adjacent to the enlarged central part 31 of the body. The sleeve 36 is externally screw-threaded adjacent to its outer end, the screw-thread engaging a corresponding screw-thread in the end part of the body 30. A lock nut 37 on the outer part of the sleeve 36 and engaging the end of the body 31 serves to secure the sleeve 36 in any desired axial position. The sleeve is formed with a circumferential groove 38 aligned with the associated outlet port 34, and a resilient sealing ring is provided in a recess in the sleeve on either side of the groove, these rings being numbered 39 and 40 and co-operating with the interior face of the body. An aperture 41 in the wall of the sleeve 36 connects the groove 38 with the interior of the sleeve.

The valve has a seat formed by an inwardly directed integral flange 42 rather closer to the outer end of the sleeve than the aperture 41. A valve member, comprising a resilient sealing disc 43 mounted on a mushroom-shaped carrier 44, engages the outer face of the valve seat. As shown the valve member fits loosely in the sleeve to allow air to pass when lifted from its seat. Outwardly of the valve member the bore of the sleeve 36 increases in diameter providing a shoulder 45 which serves as the seating for a restrictor 46 comprising a metal disc with a small central hole 47 and eccentric legs 48 which extend towards the back of the valve member. The arrangement is such that air flows through the hole 47 in the restrictor when the valve member is first lifted, but that on further displacement of the valve member the legs 48 of the restrictor disc engage the valve member and the disc is lifted off its seating to allow less restricted air flow to occur.

The outer end of the sleeve 36 is internally screw-threaded and is engaged by a tubular end member 49 which projects into the end of the sleeve. A sealing ring 50 is provided in a circumferential recess in the end member 49 this engaging the interior face of the sleeve. The end member has an inlet port 51 at its outer end and has an inwardly directed flange 52 of triangular cross-section, the inner face of which acts as the seating for the hemispherical head of a mushroom-shaped non-return valve 53 formed of resilient material. A helical compression spring 54 bears on the underside of the head of the non-return valve, its other end bearing on the restrictor 46 the differential air pressure serving to bias the valve member towards the valve seat.

The fluid inlet ducting valve to the right of FIGURES 1 and 2 has no restrictor and the spring 54' bears on the rear face of the valve member carrier 44'.

The valve has an actuating member in the form of a rod 55 extending axially of the body between the valves and slidable in the inner parts of the valve sleeves 36 and 36'. Sealing rings 56 and 56' inset in the end parts of the rod co-operate with the sleeves to prevent air from either valve leaking into the central part of the body. The ends of the rod 55 are reduced to form terminal spigots 57 and 57' for engaging the resilient discs 43 and 43' of the adjacent valve members and lifting the members off their seats thus opening the valves.

The rod 55 is provided at its centre with a transverse open-ended slot 58 engaged by an eccentric pin 59 on the end face of the operating shaft 32, rotation of the shaft thus causing axial movement of the rod. This movement is limited in each direction by the abutment between the side of the rod and one or other of the radial faces of a quadrant-shaped stop 60 projecting from the end face of the operating shaft at a position diametrically opposed to the pin 59. The shaft 33 is rotated by a laterally extending arm 61 which is in use connected to a suitable linkage such as 62.

By varying the distance between the valves it is possible to arrange for the actuating rod 55 to have a predetermined range of movement in which both valves are closed, and the adjustment can be effected from outside the valve unit merely by slackening one of the lock nuts 37 and 37' and rotating the associated sleeve 36 or 36'. It is found that with this arrangement it is a simple matter to set the valve unit as desired and that there is little or no tendency for it to get out of adjustment. The unit can, of course, be set either before the valve is installed in a vehicle or after installation whichever is the more convenient.

A levelling valve suitable for use with the suspension system of this invention is shown in FIGURES 3 and 4 which is somewhat similar in construction to one of the valves incorporated in the master valve means. Parts in the levelling valve corresponding to parts in this valve previously described are indicated by numerals which are the same apart from the addition of the prefix 1. In addition the levelling valve has an exhaust port 163 in the body 130 between the port 134 and the enlarged part of the body 131. This port communicates with a groove 164 in the sleeve 136, the passage of air between this groove and the enlarged part of the body being prevented by a sealing ring 165 in a recess in the sleeve. An aperture 166 in the sleeve serves to connect the groove 164 with a further groove 167 in the rod 155, a sealing ring 168 in a recess in the rod preventing the passage of air between the groove 167 and the enlarged part of the body. Finally, the groove 167 communicates with a T-shaped passageway 169 terminating in the end of the spigot 157. When the valve member is lifted off its seat by the actuating member the sealing disc 143 closes the end of the passageway 169, but when the valve member is on its seat and the actuating member is withdrawn the end of the passageway is opened and there is then communication between the port 134 and the exhaust port 163.

By adjusting the position of the sleeve 136 in the body 130 the position of the valve seal 142 is varied so that the mean position of the arm 161, that is the position in which the interconnections between the ports 134, 151 and 163 are all closed, is correspondingly varied.

Referring now to FIGURE 5 there is shown schematically the arrangement and interconnections of master valve means, two levelling valves and their associated air springs. The master valve means and levelling valves are mounted on a vehicle body (not shown). The master valve means 200 is shown as having valve members 201 and 201' actuated by rod 202 connected, by bell-crank 203 pivoted at 204, to link 205 pivoted at 206 to the axle on which the wheel units are mounted (not shown) at a point such that the link is not moved relative to the master valve means when the vehicle rocks about the wheel units supported by the air springs illustrated, but is so moved when there is a change of the load carried by the wheel units. The point to which the link is pivoted is often referred to as the "rolling centre." The levelling valves 207 have valve members 208 which are controlled by rods 209 pivoted at 210 and each connected at its outer end to one end of a link 211 which is pivoted at its other end 212 to the axle (not shown) at a point adjacent to the associated wheel unit. The arrangement is such that relative vertical movement between either wheel unit and the neighbouring part of the vehicle body causes actuation of the levelling valve. The air springs 213 are of the well known rolling diaphragm kind, although any other suitable kind of air spring may well be used instead.

The inlet of the right hand valve of the master valve means is connected to the pressurized air side 214 of the air inlet ducting, and the outlet of this valve is connected to the levelling valve side 215 of the air inlet ducting. Conversely, the inlet of the left hand valve of the master valve means is connected to the levelling valve side 216 of the air exhaust ducting, and the outlet of this valve is open to exhaust through the ducting 217. In practice the exhaust ducting of the left hand valve of the master valve means may consist solely of the outlet port of the valve, but where the pressurized air is supplied by a compressor the exhaust ducting may lead back to the input side of the compressor. Similarly where a liquid is used the exhaust ducting leads back to the liquid supply tank.

The diagram illustrates the parts in the positions which they assume when the body is level relative to the wheel units and at the desired height above the wheel units. If the vehicle rocks from side to side the levelling valves are actuated, one connecting the associated spring to the air inlet ducting 215 and the other connecting its associated air spring to the air exhaust ducting 216. Interconnection between the air springs is prevented, however, and as the master valve means are not actuated air neither enters nor leaves springs to any significant extent. The air springs are thus able to exert a restoring couple on the body by virtue of the elastic properties of the air they contain and there is no need to employ additional means for this purpose. If, on the other hand the body remains level but the load on the wheel units is increased sufficiently to compress the air springs to a predetermined extent the right hand valve of the master valve means opens and both levelling valves are actuated to connect the air springs with the air inlet ducting 215. Air then enters the springs and the body is raised until the valves close again. Similarly if the load on the wheel units is reduced sufficiently to allow the air springs to expand to a predetermined extent the left hand valve of the master valve means opens and both levelling valves are actuated to connect the air springs with the air exhaust ducting 216. Air is then expelled from the springs and the body lowered until the valves close again. If air enters or leaves one air spring faster than it enters or leaves the other and so reaches its correct position first, the associated levelling valve will be closed and the other air spring enabled to reach its correct position afterwards. Finally, if the body rocks and the load on the wheel units changes at the same time the levelling valves may be actuated in such a manner that one air spring is connected to the air inlet duct and the other air spring is connected to the air exhaust duct, and at the same time one of the valves of the master valve means is opened, the other remaining closed. If this occurs then one spring will have air supplied to it or expelled from it so as to counteract the rocking and to restore the body to the correct height, and the other spring will act solely to counteract the rocking.

The application of this system to a vehicle is shown diagrammatically in FIGURE 6. The vehicle has a body including the chassis 218, and also has front and rear axles 219 and 220 respectively, and wheels 221. The chassis is supported on the front axle by air springs 222 and 223 of any suitable kind, and on the rear axle by pairs of air springs 224 and 225. Each air spring or pair of air springs has an associated levelling valve 226 secured to a neighbouring part of the chassis. Each levelling valve 226 similar to that previously described with reference to FIGURES 3 and 4. The actuating arms of the valves are connected to the axles by suitable linkages (not shown) so that if the chassis is too low with respect to any wheel the associated valve is opened to connect the associated air spring or springs through ducting 227 to the air inlet ducting 228, and if the chassis is too high with respect to any wheel the associated valve is opened to connect the associated air spring or springs through ducting 227 to the air exhaust ducting 229. Each pair of laterally spaced wheels has an associated master valve means 230 mounted on the chassis and similar to that previously described with reference to FIGURES 1 and 2. The actuating arms of these valve means are connected by suitable linkages (not shown) to the rolling centres of the axles so that the master valve means are not actuated on rolling and are only actuated by changes in load on the associated pairs of wheels. When the load increases sufficiently the air inlet ducting 228 is connected to the air inlet ducting 231 connected to the pressurized air reservoir 232 fed with pressurized air from an air compressor 233 driven by the vehicle engine 234. Conversely when the load decreases sufficiently the air exhaust ducting 229 is connected to the corresponding exhaust 235.

When this form of air suspension is used the vehicle body is found to ride smoothly, without the use of an undue quantity of pressurized air. Moreover sudden movement of the body by the rapid introduction or removal of air to or from the springs is prevented by the provision in the valves of the restrictors 46 and 146 which allow only a restricted flow to occur when the valves are actuated by a relatively small movement, a less restricted flow occurring on greater movement.

Numerous modifications may, of course, be made without departing from the scope of the invention. Thus time-delay valves may be employed in certain circumstances, and in particular the master valve means may be arranged to operate with a time delay whilst the levelling valves remain of the instantaneous kind. Also where the rolling centre is not fixed and is dependent on the extent of the rocking movement, a link arrangement may be employed to provide a point, for attachment of the actuating linkage of the master valve means, which, when rolling occurs, is substantially stationary relatively to the vehicle body on which the master valve means is mounted, but which moves relatively to the chassis when the load carried by the wheel units is changed. In order to avoid unduly complex linkages presenting attachment points with ideal movement characteristics the arrangement may be made such that the master valve means only operates on significant relative displacement between the chassis and wheel units from a mean position, the valve means being unaffected, for example, by a displacement of ⅛".

I claim:

1. A fluid spring suspension for wheeled vehicles comprising a fluid spring means for supporting each side of the vehicle body above the wheel units thereof; a levelling valve for controlling passage of fluid to and from each of said fluid spring means; and master control means for controlling passage of fluid to and from said levelling valves and said spring means, said master control means including a valve and actuating linkage for said valve, said linkage being connected to operate upon relative movement of the vehicle body and the wheel units, said fluid spring means and said linkage lying in substantially the same vertical plane extending transversely of the vehicle whereby said master control means normally prevents passage of fluid to or from said spring means but enables passage of flow to or from said spring means under the control of said levelling valves when the position of the wheel units relative to the vehicle body varies a predetermined amount from the desired normal position.

2. A fluid spring suspension for vehicles having wheel units on opposite sides thereof comprising: a fluid spring for supporting each side of the vehicle body above the wheel units thereof; a levelling valve for controlling passage of fluid to or from each of said fluid springs; levelling valve actuating linkage connected to each of the wheel units on opposite sides of the vehicle operative in response to the position of each wheel unit relative to the vehicle body; a master control valve means for controlling passage of fluid to or from said levelling valves and said fluid springs; said master control valve means including inlet ducting connected to a source of pressure fluid, exhaust ducting, and actuating means for connecting said inlet ducting to said levelling valves and said fluid springs upon a predetermined increase in vehicle loading and said exhaust ducting to said levelling valves and said fluid springs upon a predetermined decrease in vehicle loading, said actuating means being connected at the rolling center of the vehicle and substantially in the same transverse vertical plane containing said fluid spring means whereby said master control valve blocks passage of fluid in both said inlet and outlet ductings when the vehicle rocks relative to said wheel units.

3. A vehicle suspension according to claim 2, in which the fluid is air.

References Cited in the file of this patent

UNITED STATES PATENTS

| | | |
|---|---|---|
| 1,555,199 | Gouirand | Sept. 29, 1925 |
| 2,848,249 | Bertsch | Aug. 19, 1958 |
| 2,888,270 | Wolfram | May 26, 1959 |
| 2,962,296 | Jackson | Nov. 29, 1960 |
| 2,993,706 | Kilgore | July 25, 1961 |